(12) United States Patent
Kim et al.

(10) Patent No.: US 7,764,275 B2
(45) Date of Patent: Jul. 27, 2010

(54) TOUCH SENSOR TRACK POINT AND METHODS

(75) Inventors: Moon J. Kim, Wappingers Falls, NY (US); John E. Moore, Jr., Brownsburg, IN (US); Eric C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 11/619,773

(22) Filed: Jan. 4, 2007

(65) Prior Publication Data

US 2008/0165131 A1 Jul. 10, 2008

(51) Int. Cl.
*G06F 3/041* (2006.01)
(52) U.S. Cl. ....................... 345/173; 345/157
(58) Field of Classification Search ......... 345/156–163; 400/485
See application file for complete search history.

(56) References Cited

U.S. PATENT DOCUMENTS

| | | | |
|---|---|---|---|
| 5,568,987 A * | 10/1996 | Franz .......................... 400/490 |
| 5,712,660 A | 1/1998 | Martin | |
| 6,198,472 B1 | 3/2001 | Lection et al. | |
| 6,243,077 B1 | 6/2001 | Manara et al. | |
| 6,271,834 B1 | 8/2001 | May et al. | |
| 6,331,849 B1 | 12/2001 | VandenBoom | |
| 6,509,890 B1 | 1/2003 | May | |
| 6,788,291 B2 * | 9/2004 | Burry .......................... 345/161 |
| 7,081,883 B2 * | 7/2006 | Chen .......................... 345/163 |
| 2003/0085874 A1 * | 5/2003 | Burry .......................... 345/161 |
| 2003/0210233 A1 * | 11/2003 | Frulla .......................... 345/168 |
| 2004/0017355 A1 * | 1/2004 | Shim .......................... 345/157 |
| 2004/0212586 A1 * | 10/2004 | Denny, III ................... 345/156 |
| 2006/0038774 A1 | 2/2006 | Mese et al. | |

* cited by examiner

*Primary Examiner*—Nitin Patel
(74) *Attorney, Agent, or Firm*—William Schiesser; Hoffman Warnick LLC

(57) ABSTRACT

The present invention provides a touch sensor track point (and methods) for a computer such as a laptop or portable device (e.g., PDA, cellular phone, etc.). The touch sensor track point includes a shaft (e.g., typically positioned on a keyboard) and a set (at least one) of directional sensors positioned over a top surface of the shaft. The set of directional sensors can detect manipulations in three dimensions (up-down, left-right, and in-out). In a typical embodiment, the touch sensor track point will cause a computer cursor to move in a direction that corresponds to a location on the set of directional sensors at which a vertical touch is applied. With such a capability, the touch applied to the set of vertical sensors can optionally be substantially horizontally motionless.

13 Claims, 3 Drawing Sheets

TOUCH SENSOR TRACK POINT AND METHODS

FIELD OF THE INVENTION

The present invention generally relates to computer cursor manipulation. Specifically, the present invention provides a touch sensor track point and related methods.

BACKGROUND OF THE INVENTION

Nestled between the G, H, and B keys on many laptop/notebook computers is a track point device. Often referred to as "the little red button," the track point is a major selling feature of the notebooks such as IBM's ThinkPad line of computers (IBM, ThinkPad and related terms are trademarks of IBM Corp. in the United States and/or other countries). A present implementation of the track point causes the track point to work like a mouse device in that a computer cursor will move in a direction that corresponds to a horizontal manipulation of the track point. While the track point can be highly convenient, the size of the track point head is small so that one finger is used to manipulate the track point. In order to give more traction, the track point head can be covered with a cap.

One version of the track point is called the tactile track point, which has an actuator beneath the track point device that can stimulate the user's finger. The actuator bumps upwards against the user's finger to provide tactile feedback that indicates the meaning of the computer cursor location. With the tactile track point, the user can "feel" icons, title bars, menu items, and window borders. These responses allow more accurate movement and selection by complementing the visual feedback with a sense of touch.

Another type of track point is called the negative inertia track point. Specifically, the dynamics of computer cursor movement are important for fast and accurate manipulation. With static transfer functions, the movement is always somewhat sluggish. That is, it takes a finite time for the user to apply and remove force from the track point. Therefore the computer cursor motion always starts and stops slowly, as if the computer cursor had inertia—it takes time to get it moving and get it to stop again. Negative inertia solves this problem by counteracting that inertia. This effect is accomplished by exaggerating changes in the input force.

Unfortunately, each of the above track points require either horizontal movement of the track point's shaft or of the user's finger as pressure is applied to cause a movement of the computer cursor, which can cause wear and tear to the track point. In view of the foregoing there exists a need for an approach that solves at least one of the deficiencies of the related art.

SUMMARY OF THE INVENTION

The present invention provides a touch sensor track point (and methods) for a computer such as a laptop or portable device (e.g., PDA, cellular phone, etc.). The touch sensor track point includes a shaft (e.g., typically positioned on a keyboard) and a set (at least one) of directional sensors positioned over a top surface of the shaft. The set of directional sensors can detect manipulations in three dimensions (up-down, left-right, and in-out). In a typical embodiment, the touch sensor track point will cause a computer cursor to move in a direction that corresponds to a location on the set of directional sensors at which a vertical touch is applied. With such a capability, the touch applied to the set of vertical sensors can optionally be substantially horizontally motionless. The set of directional sensors are also configured to register/produce a single click event in response to a contemporaneous vertical pressing and releasing of the set of directional sensors and/or a double click event in response to a repeated contemporaneous vertical pressing and releasing of at least one of the set of directional sensors. The touch sensor track point of the present invention can also incorporate features of track point devices now known (e.g., as discussed above) or later developed.

A first aspect of the present invention provides a touch sensor track point, comprising: a shaft; and a set of directional sensors positioned over a top surface of the shaft, the set of directional sensors being configured to cause a movement of a computer cursor in a desired direction in response to a vertical touch being applied to the set of directional sensors at a location corresponding to the desired direction.

A second aspect of the present invention provides a method for providing a touch sensor track point, comprising: positioning a shaft on a keyboard; and positioning a set of directional sensors over a top surface of the shaft, the set of directional sensors being configured to cause a movement of a computer cursor in a desired direction in response to a vertical touch being applied to the set of directional sensors at a location corresponding to the desired direction.

A third aspect of the present invention provides a method for moving a computer cursor, comprising: receiving a vertical touch on at least one of a set of directional sensors positioned over a top surface of a shaft; and moving the computer cursor in a direction that corresponds to a location in which the vertical touch was received on the at least one of the set of directional sensors.

Therefore, the present invention provides a touch sensor track point and related methods.

BRIEF DESCRIPTION OF THE DRAWINGS

The foregoing and other exemplary purposes, aspects and advantages will be better understood from the following detailed description of an exemplary embodiment of the invention with reference to the drawings.

Figure 1:
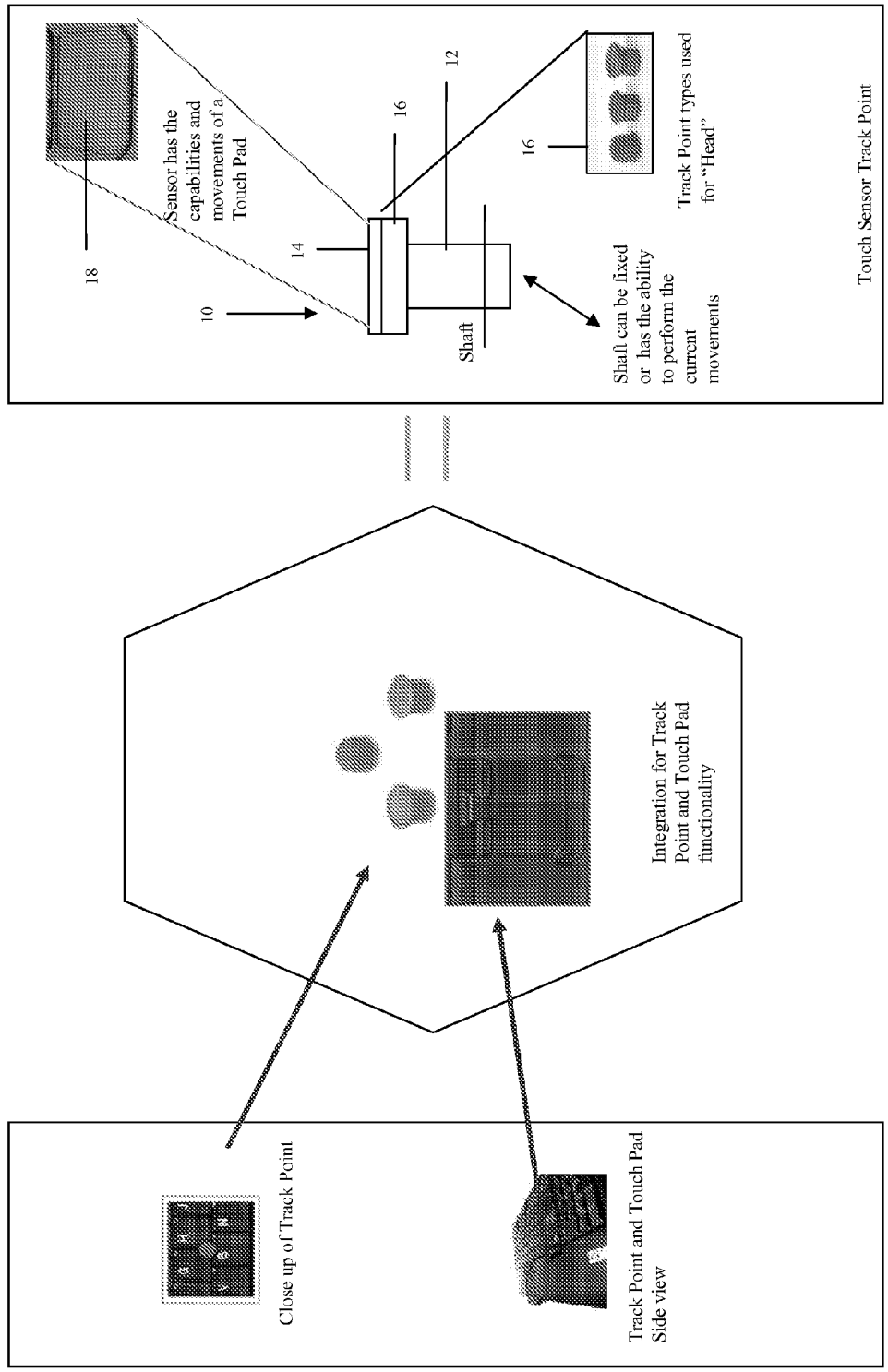
FIG. 1 shows a first view of a touch sensor track point according to an aspect of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a touch sensor track point (and methods) for a computer such as a laptop or portable device (e.g., PDA, cellular phone, etc.). The touch sensor track point includes a shaft (e.g., typically positioned on a keyboard) and a set (at least one) of directional sensors positioned over a top surface of the shaft. The set of directional sensors can detect manipulations in three dimensions (up-down, left-right, and in-out). In a typical embodiment, the touch sensor track point will cause a computer cursor to move in a direction that corresponds to a location on the set of directional sensors at which a vertical touch is applied. With such a capability, the touch applied to the set of vertical sensors can optionally be substantially horizontally motionless. The set of directional sensors are also configured to register/produce a single click event in response to a contemporaneous vertical pressing and releasing of at least one of the set of directional sensors and/or a double click event in response to a repeated contemporaneous vertical pressing and releasing of the set of directional sensors. The touch sensor track point of the present invention can also incorporate features of track point devices now known (e.g., as discussed above) or later developed.

It should be understood that the touch sensor track point of the present invention induces movement of a computer cursor for example by communication of a signal to a processing unit when pressure is applied to the touch sensor track point corresponding to a direction. In turn, the processing unit causes the computer cursor to move in the direction. Among other things, the present invention allows the signal to be realized in a manner not previously known.

Referring now to FIG. 1, a touch sensor track point 10 according to one aspect of the present invention is shown. As depicted, touch sensor track point 10 includes a shaft 12 and a set (e.g., one or more) of directional sensors 14 positioned over a top surface of shaft 12 (e.g., on a track point head 16 or directly on shaft 12 if a separate track point head 16 is not used). In general, set of directional sensors 14 replace the cap-top that has been used on existing track point devices. The sensor logic is similar to the standard track point logic. When a user desires to move the computer cursor to a target, the user will touch (e.g., with his/her finger, a writing implement, a stylus, etc.) set of directional sensors 14 in the direction of the target. The user need not press and move as with conventional track points.

Set of directional sensors 14 can have many capabilities. For example, set of directional sensors 14 can have the capabilities currently realized by a touch pad 18 present in many portable computers so that horizontal manipulation of set of directional sensors 14 can cause a corresponding movement of the computer cursor movement. Moreover, in a typical embodiment, set of directional sensors 14 are positioned complimentary to a border of the top surface (e.g., 360 degrees about a circumference of the top surface when the touch sensor track point 10 is round in shape). In such an embodiment, a touch applied to set of directional sensors 14 will cause a computer cursor to move in a direction corresponding to a location on set of directional sensors 14 at which the touch is applied. With this embodiment, the pressure can be substantially horizontally motionless while still causing a corresponding movement of the computer cursor as displayed on a monitor or other display device. In addition, shaft 12 can be horizontally fixed or moveable.

Figure 2:
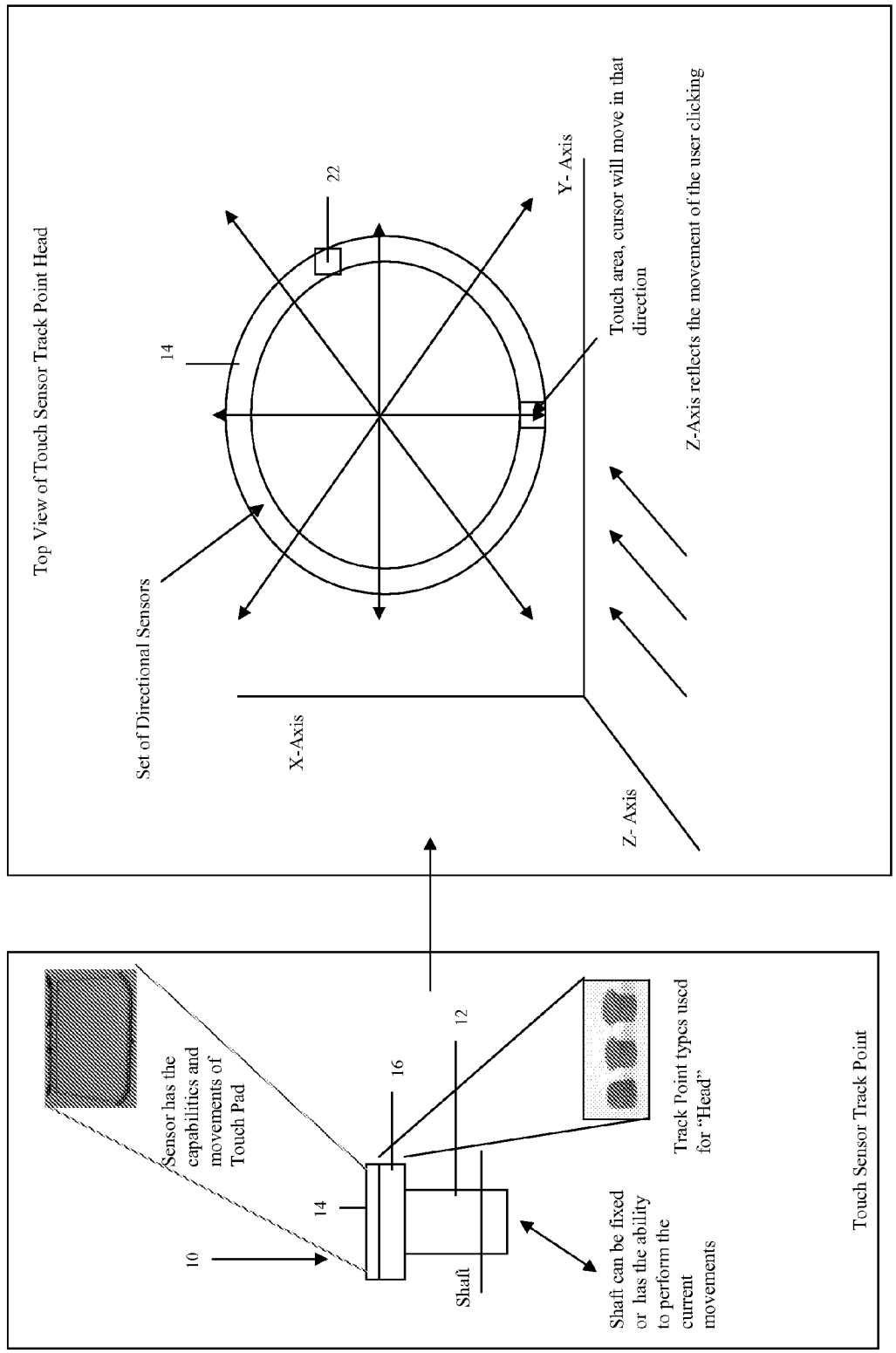
FIG. 2 shows an illustrative top view of a set of directional sensors according to an aspect of the present invention.

Referring now to FIG. 2, an illustrative top view of set of directional sensors 14 is shown. As shown in this example, set of directional sensors 14 are positioned complimentary to a border of the top surface of shaft 12. In this example, set of directional sensors 14 are positioned in a 360 degree fashion about the circumference of the top surface. When one of the set of directional sensors 14 is pressed at location 22, the computer cursor will move in a corresponding direction. Specifically, by pressing (i.e., touching) and holding one of the set of directional sensors 14, the computer cursor will move in the target direction. In other words, the computer cursor will follow the direction to which pressure is applied on set of directional sensors 14. As further shown, touch sensor track point 10 can be configured to allow manipulation in three dimensions (relative to the keyboard), up-down (x-axis), left-right (y-axis), and in-out (z-axis). Pressure applied and released to at least one of set of directional sensors 14 in the z-axis will cause click events to be registered. Specifically, a contemporaneous pressing and releasing of set of directional sensors 14 will cause a single click event to be registered, while a double pressing and releasing of at least one of set of directional sensors 14 will cause a double click event to be registered. In this embodiment, the click event could be registered solely by the at least one of set of directional sensors 14, and/or by actuation of shaft 12 (into and then out of the keyboard) due to the pressing and releasing.

Figure 3:
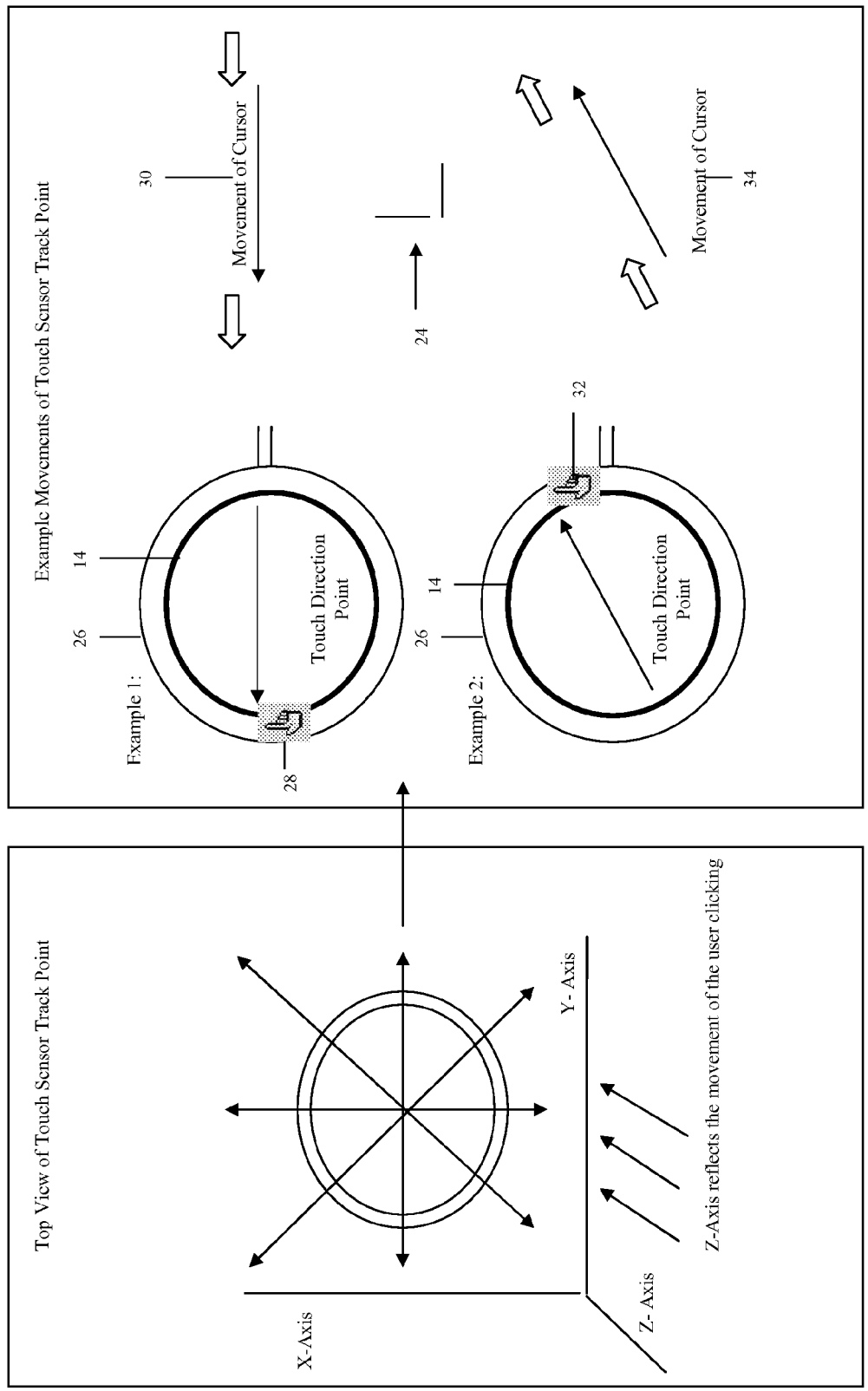
FIG. 3 shows illustrative movements of the touch sensor track point according to an aspect of the present invention.

Referring now to FIG. 3, illustrative movements of a computer cursor 24 in response to a touching of set of directional sensors 14 is shown. As can be seen, when set of directional sensors 14 is touched (e.g., vertically) at a first location 28, computer cursor 24 will have a direction of movement 30 that corresponds to first location 28. That is, computer cursor 24 will move in a direction that corresponds to first location 28's position with respect to set of directional sensors 14 as a whole. Similarly, when set of directional sensors 14 is touched (e.g., vertically) at a second location 32, computer cursor 24 will have a corresponding direction of movement 34.

Among other modes, touch sensor track point 10 (FIG. 1) can have the following modes:

Press-to-select: Point with Press-to-Select gives user the complete point-and-select function under one fingertip. Specifically, the user moves computer cursor 24 (FIG. 2) to its target and then indicates "select this object" with a light, quick pressure of the same fingertip downward into the keyboard, without shifting the focus. A double-click is, naturally, a double-press, with the same adjustable time constraints as for the usual double-click.

Drag: If "Drag" is enabled, objects can be dragged on the screen, by pressing and holding. Only a very light pressure is needed to maintain the drag. Thereafter, a release of the pressure will cause the selected object to be released.

Release-to-Select: If "Release-to-Select" is enabled, a user can indicate a selection by holding a downward pressure while computer cursor 24 is moving, then stopping the computer cursor 24's movement at the target point while still applying the pressure, and then lifting his/her finger quickly. If the lifting is followed with a quick pressing, a double click will be registered.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A touch sensor track point, comprising:
   a fixed shaft; and
   a set of directional sensors positioned over a top surface of the shaft, the set of directional sensors being configured to cause a movement of a computer cursor in a desired direction in response to a vertical touch being applied to the set of directional sensors at a location corresponding to the desired direction, the vertical touch being substantially horizontally motionless.

2. The touch sensor track point of claim 1, the set of directional sensors being further configured to register a click event when at least one sensor of the set of directional sensors is substantially contemporaneously pressed and released in a vertical direction.

3. The touch sensor track point of claim 1, the set of directional sensors being positioned complimentary to a border of the top surface.

4. The touch sensor track point of claim 3, the set of directional sensors being positioned 360 degrees about a circumference of the top surface.

5. The touch sensor track point of claim 1, the touch sensor track point being positioned on a keyboard.

6. The touch sensor track point of claim 1, the set of directional sensors comprising a plurality of directional sensors.

7. The touch sensor track point of claim 1, the set of directional sensors comprising a single directional sensor.

8. A method for providing a touch sensor track point, comprising:
   positioning a fixed shaft on a keyboard; and
   positioning a set of directional sensors over a top surface of the shaft, the set of directional sensors being configured to cause a movement of a computer cursor in a desired direction in response to a vertical touch being applied to the set of directional sensors at a location corresponding to the desired direction, the vertical touch being substantially horizontally motionless.

9. The method of claim 8, further comprising registering a click event of the computer cursor in response to a substantially contemporaneous pressing and releasing of at least one sensor of the set of directional sensors in a vertical direction.

10. The method of claim 8, the positioning the set of directional sensors comprising positioning of the set of directional sensors complimentary to a border of the top surface.

11. The method of claim 10, the positioning the set of directional sensors comprising positioning of the set of directional sensors about a circumference of the top surface.

12. A method for moving a computer cursor, comprising:
    receiving a vertical touch on at least one of a set of directional sensors positioned over a top surface of a fixed shaft, the vertical touch being substantially horizontally motionless; and
    moving the computer cursor in a direction that corresponds to a location in which the vertical touch was received on at least one of the set of directional sensors.

13. The method of claim 12, further comprising registering a click event in response to a substantially contemporaneous pressing and releasing of at least one sensor of the set of directional sensors in a vertical direction.

\* \* \* \* \*